(12) United States Patent
Waldron

(10) Patent No.: US 10,605,603 B2
(45) Date of Patent: Mar. 31, 2020

(54) NAVIGATION SYSTEMS AND METHODS

(71) Applicant: Goodrich Corporation, Charlotte, NC (US)

(72) Inventor: Erik L. Waldron, Concord, MA (US)

(73) Assignee: Goodrich Corporation, Charlotte, NC (US)

( * ) Notice: Subject to any disclaimer, the term of this patent is extended or adjusted under 35 U.S.C. 154(b) by 170 days.

(21) Appl. No.: 15/701,177

(22) Filed: Sep. 11, 2017

(65) Prior Publication Data

US 2019/0078894 A1 Mar. 14, 2019

(51) Int. Cl.
| | | |
|---|---|---|
| *G01C 21/02* | (2006.01) | |
| *B64G 1/24* | (2006.01) | |
| *G01C 15/00* | (2006.01) | |
| *G01C 21/16* | (2006.01) | |
| *H04N 5/225* | (2006.01) | |
| *H04N 5/33* | (2006.01) | |

(52) U.S. Cl.
CPC ......... *G01C 21/025* (2013.01); *B64G 1/244* (2019.05); *G01C 15/002* (2013.01); *G01C 21/02* (2013.01); *G01C 21/165* (2013.01); *H04N 5/225* (2013.01); *H04N 5/332* (2013.01)

(58) Field of Classification Search
CPC combination set(s) only.
See application file for complete search history.

(56) References Cited

U.S. PATENT DOCUMENTS

| | | | |
|---|---|---|---|
| 7,418,343 B1 * | 8/2008 | McGraw | G01S 3/36 244/76 R |
| 8,604,966 B1 | 12/2013 | Luk-Paszyc et al. | |
| 8,767,072 B1 * | 7/2014 | Rosenwinkel | G01C 21/025 348/148 |
| 8,837,782 B1 | 9/2014 | Rosenwinkel et al. | |
| 9,217,643 B1 | 12/2015 | Belenkii et al. | |
| 9,250,312 B1 * | 2/2016 | Knibbe | G01S 5/163 |
| 9,503,177 B1 | 11/2016 | Shi et al. | |
| 9,528,834 B2 | 12/2016 | Breed et al. | |
| 9,702,702 B1 | 7/2017 | Lane et al. | |
| 2011/0077863 A1 * | 3/2011 | Brace | G01C 21/025 701/532 |

(Continued)

FOREIGN PATENT DOCUMENTS

| | | |
|---|---|---|
| CN | 106595702 A | 4/2017 |
| WO | WO-8601593 A1 | 3/1986 |
| WO | WO-2016209327 A1 | 12/2016 |

OTHER PUBLICATIONS

Extended European Search Report for European Patent Application No. EP18193496.9, dated Feb. 5, 2019.

(Continued)

*Primary Examiner* — Rami Khatib
(74) *Attorney, Agent, or Firm* — Locke Lord LLP; Scott D. Wofsy; Judy R. Naamat

(57) ABSTRACT

A navigation method includes imaging a first celestial object with an imaging device and calibrating the pointing of the imaging device to position of the first celestial object in the image. A second celestial object and a satellite are imaged and position of the platform determined using position of the conjunction of the second celestial object and the satellite in the image of the second celestial object and satellite. Navigation systems are also described.

19 Claims, 3 Drawing Sheets

(56) References Cited

U.S. PATENT DOCUMENTS

| | | | |
|---|---|---|---|
| 2011/0275408 A1* | 11/2011 | Kulik | G01C 17/34 |
| | | | 455/556.1 |
| 2011/0293139 A1 | 12/2011 | Ohta | |
| 2012/0116711 A1* | 5/2012 | Bruns | G01C 17/34 |
| | | | 702/150 |
| 2013/0325316 A1* | 12/2013 | Vos | G01C 17/34 |
| | | | 701/408 |
| 2014/0278082 A1 | 9/2014 | DeVries | |
| 2017/0131096 A1 | 5/2017 | Karlov et al. | |

OTHER PUBLICATIONS

Willhite, W.B. et al: "An Analysis of ICBM Navigation Using Optical Observations of Existing Space Objects", Jun. 1, 2014 (Jun. 1, 2014), XP055546116, Retrieved from the Internet: URL:dspace.mit.edu/bitstream/handle/1721.1/57986/639293386-MIT.pdf [retrieved on Jun. 22, 2019]; Sections 1.2 and 4.

Extended European Search Report for European Patent Application No. EP18193447.2, dated Jan. 29, 2019.

McIntyre, J.E. et al: "A star scan/attitude determination experiment conducted on the geostationary meteorological satellite", ACTA Astronautica, vol. 7, No. 7, Feb. 1, 1980 (Feb. 1, 1980), pp. 137-154, XP055538366, GB ISSN: 0094-5765, DOI: 10.1016/0094-5765(80)90056-9.

\* cited by examiner

NAVIGATION SYSTEMS AND METHODS

BACKGROUND OF THE INVENTION

1. Field of the Invention

The present disclosure generally relates to navigation, and more particularly to navigation using artificial satellite and celestial observations acquired using imaging devices.

2. Description of Related Art

Prior to the introduction and widespread adoption of global positioning system (GPS) technology, stellar observations were frequently used to determine location. For example, devices like the sextant were developed to make stellar observations and determine position of ships beyond the sight of land. Although such devices remain in use today the simplicity, reliability and global availability of GPS has generally replaced the stellar observation in most applications.

Reliance upon GPS is not without risk. For example, in some environments GPS signals can become unavailable due to environmental factors or denial, such as by an adversary on the battlefield. GPS can be also be spoofed, for example by altering a GPS signal such that a GPS device reports an incorrect position to the user. In most applications the impact of GPS information denial creates inconvenience; users simply return to traditional methods of navigation to determine position and manage travel. GPS spoofing can be more problematic as a user may be unaware of consequent positional error due to spoofed GPS information until collateral issue become apparent, such as an autonomous vehicle being unable to reach a desired location or creating a hazard for other objects in the vehicle environment.

Such conventional systems and methods of navigation have generally been considered satisfactory for their intended purpose. However, there is still a need in the art for improved navigation systems and methods. The present disclosure provides a solution for this need.

SUMMARY OF THE INVENTION

A navigation method includes imaging a first celestial object with an imaging device and calibrating the pointing of the imaging device to position of the first celestial object in the image. A second celestial object and a satellite is imaged and position of the platform determined using position of a conjunction of the second celestial object and the satellite in the image including the second celestial object and the satellite.

In certain embodiments, imaging the first and/or second celestial object can be done from an airborne vehicle during flight. The first and/or second celestial object can be imaged using electromagnetic radiation emitted and/or reflected from a star and/or an artificial satellite. The electromagnetic radiation can include visible waveband illumination or infrared waveband illumination. Pointing of the imaging device can be calibrated by determining differences between an expected and an actual position of the first celestial object in the image.

In accordance with certain embodiments, differences between the expected position of the celestial object in the image and the actual position of the celestial object in the image can be nulled to calibrate pointing of the imaging device. A second pointing can be computed using the image the second celestial object and the satellite. The second pointing can be computed by determining pointing to the second celestial object and the satellite simultaneously. One of the satellite and the second celestial object can be fixed while acquiring a plurality of images during conjunction of the second celestial object and the star. It is contemplated that the first and second celestial objects can be a common celestial object.

It is also contemplated that, in accordance with certain embodiments, the position of the platform can be determined by computing closed surfaces above the earth based on trajectory of the satellite, the conjunction image, and estimated altitude of the platform. Determining position of the platform can include computing intersection of a line of sight from the platform to the earth using calibrated line of sight and updated vehicle position.

A navigation system includes an imaging device and a controller. The controller is operably connected to the imaging device and is responsive to instructions recorded on a non-transitory machine-readable memory to image a first celestial object with the imaging device, calibrate pointing of the imaging device to position of the first celestial object in the image, and image a conjunction between second celestial object and a satellite. Position of the platform is determined using position of the conjunction between then second celestial object and satellite.

In certain embodiments, the imaging device can include a focal plane detector responsive to visible or infrared illumination to image a scene. The instructions can cause the controller to determine difference between an expected position of the first celestial object and an actual position of the first celestial object in the image. The instructions can also cause the controller to in-flight calibrate pointing of the imaging device by nulling difference between the expected position of the first celestial object and the actual position of the first celestial object in the scene.

In accordance with certain embodiments, the instructions can cause the controller to compute pointing to the conjunction between the second celestial object and the satellite in the image of the second celestial object and the satellite. Pointing can be calculated by determining pointing to the second celestial object and the star simultaneously from the platform. The instructions can cause the controller to keep one of the second celestial object and star fixed while acquiring images during conjunction of the second celestial object and the satellite.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION OF THE PREFERRED EMBODIMENTS

Figure 1:
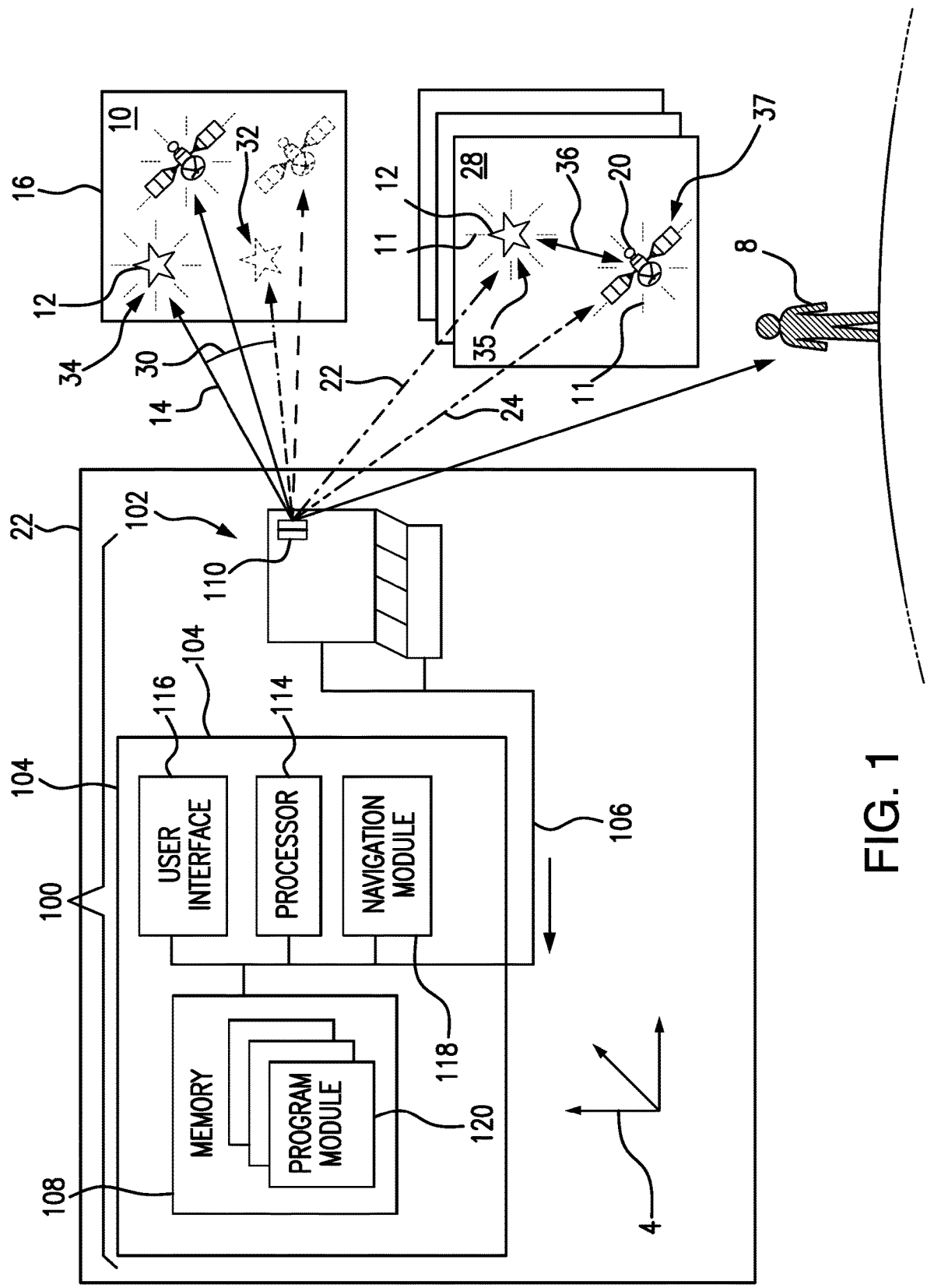
FIG. 1 is a schematic view of an exemplary embodiment of a navigation system constructed in accordance with the present disclosure, showing a controller operatively connected to an imaging device for determining position of an airborne platform.

Reference will now be made to the drawings wherein like reference numerals identify similar structural features or aspects of the subject disclosure. For purposes of explanation and illustration, and not limitation, a partial view of an exemplary embodiment of a navigation system in accordance with the disclosure is shown in FIG. 1 and is designated generally by reference character 100. Other embodiments of navigation systems and methods of determining position of an airborne platform in accordance with the disclosure, or aspects thereof, are provided in FIGS. 2 and 3, as will be described. The systems and methods described herein can be determining position of an airborne platform using an image of a celestial scene, such as an aircraft in flight, though the present disclosure is not limited to aircraft or to airborne vehicles in general.

Referring to FIG. 1, navigation system 100 is shown. Navigation system 100 includes an imaging device 102 and a controller 104 connected to one another by a communications bus 106. Imaging device 102 is responsive to electromagnetic radiation 11 incident upon imaging device 102 to generate images of scenes, e.g., celestial scene 10 or 28, using electromagnetic radiation 11. Electromagnetic radiation 11 can be illumination from within a visible waveband or an infrared waveband. It is contemplated that electromagnetic radiation 11 can be from within one or more of a near-infrared (NIR), a shortwave-infrared (SWIR), a midwave infrared (MWIR), and/or a long-wave infrared (LWIR) subdivision of the electromagnetic spectrum. As will be appreciated by those of skill in the art in view of the present disclosure, different wavelengths or wavebands can provide different information about imaged objects than others.

In the illustrated exemplary embodiment, imaging device 102 includes a focal plane detector (FPD) 110. FPD 110 can be a focal plane array (FPA) or any other detector arrangement suitable to generate imagery of a scene using electromagnetic radiation, electromagnetic radiation 11, incident upon FPD 110. In certain embodiments FPD 110 can be movably supported by a gimbal apparatus carried by an airborne platform 22, e.g., an aircraft in-flight, thereby allowing for the field of view of imaging device 102 to be pointed at a scene in a direction differing from that of a direction of movement of the airborne platform carrying imaging device 102. It is contemplated that FPD 110 (and/or imaging device 102) can be incorporated into an intelligence, surveillance and reconnaissance (ISR) device. Examples of ISR devices include MS-177 and SYERS ISR devices, available from United Technologies Aerospace Systems of Charlotte, N.C.

Controller 104 includes a processor 114, a memory 108, a user interface 116, and a navigation module 118. Navigation module 118 can include circuitry, software, or a combination of software and circuitry arranged to execute steps of method of determining position 4 of airborne platform, e.g., navigation method 200 (shown in FIG. 2). User interface 116 can include a device such as a display arranged to display mapping information for a user, e.g., a crewman of an aircraft, etc.

Processor 114 is disposed in communication with navigation module 118, user interface 116, memory 108, and imaging device 102. Memory 108 has a plurality of program modules 120 recorded thereon with instructions that, when read by processor 114 cause navigation system 100 to execute certain operations. For example, in certain embodiments, it is contemplated that the instructions cause navigation system 100 to image a celestial scene 10 including a first celestial object 12, e.g., a first star, and calibrate pointing 14 of imaging device 102. It is also contemplated that the instructions cause navigation system to image a celestial conjunction scene 28 including a second celestial object, e.g., a second star or star 12, and a satellite 20, and determine therefrom position 4 of airborne platform 22 using position 35 of first celestial object 12 and position 37 of artificial satellite 20 in images 26 of a celestial conjunction scene 28. Either or both of the first and second celestial objects can be natural satellites, stars, or artificial satellites. It is contemplated that the first celestial object and the second celestial object can be a common celestial object.

Controller 104 can be implemented as circuitry, software, or a combination of circuitry and software, as suitable for an intended application. Although described herein as calibrating pointing using a start, those of skill in the art will appreciate in view of the present disclosure that pointing can also be calibrated using artificial satellite 20. As will also be appreciated by those of skill in the art in view of the present disclosure, the conjunction can appear in a single image or in a synthetic image constructed from a plurality of separate images. As will also be appreciated by those of skill in the art in view of the present disclosure, a natural satellite also be selected and imaged in a celestial conjunction with the second celestial object.

Calibrating pointing of imaging device 102 can include determining difference 30 between an expected position 32 of the first celestial object, e.g., star 12, and an actual position 34 of first celestial object 12 in image 16 of celestial scene 10. Calibrating pointing of imaging device 102 can include nulling a difference 30 between expected position 32 of first celestial object 12 and actual position 34 of first celestial object 12 in image 16 of celestial scene 10. Examples of in-flight calibration systems and methods are as described in U.S. patent application Ser. No. 15/700,948, filed on Sep. 11, 2017, the contents of which are incorporated herein by reference in its entirety.

For purposes of determining position of airborne platform 22, the instructions recorded in one or more of program modules 120 can cause controller 104 to compute a pointing solution 36 using images 26 to conjunction of the second celestial object, e.g., second celestial object 12 and satellite 20, in conjunction scene 28. Conjunction pointing solution 36 can be calculated by determining pointing 24 to artificial satellite 20 and pointing 22 to second celestial object 12 simultaneously from airborne platform 22. It is contemplated that controller 104 keep one of second celestial object 12 and artificial satellite 20 fixed while acquiring a plurality of images 26 during conjunction of artificial satellite 20 and second celestial object 12.

Figure 2:
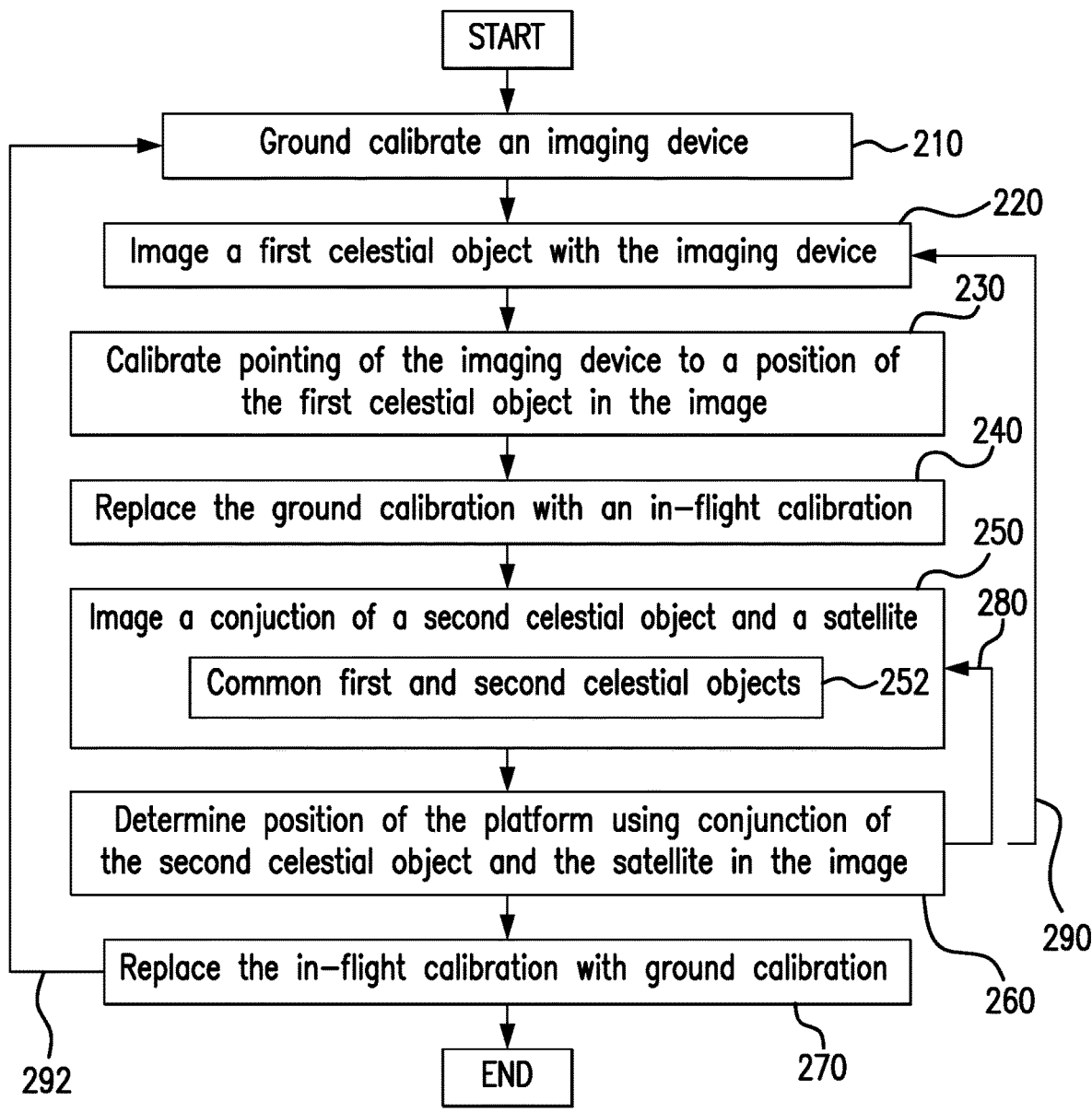
FIG. 2 is a block diagram of a method of determining position of an airborne platform using the navigation system of FIG. 1, showing steps of the method including calibrating pointing of the imaging device using an image of a first celestial object and determining position using conjunction of a second celestial object and a satellite in an image of the second celestial object and the satellite.

With reference to FIG. 2, method 200 of determining position of a platform, e.g., airborne platform 22 (shown in FIG. 1), is shown. Method 200 includes ground calibrating pointing of an imaging device, e.g., imaging device 102 (shown in FIG. 1), as shown with box 210. Once airborne, imaging device is in-flight calibrated to a celestial scene, e.g., celestial scene 10 (shown in FIG. 1), by imaging the scene and calibrating pointing of the imaging device to a celestial object, e.g., celestial object 12 (shown in FIG. 1), as shown with box 220 and box 230. The ground calibration is thereafter replaced with the in-flight calibration, as shown with box 240. It is contemplated that the celestial object can be a natural satellite, a star, or an artificial satellite.

An in image of a conjunction of artificial satellite, e.g., artificial satellite 20 (shown in FIG. 1) and a second celestial object, e.g., star 35 (shown in FIG. 1), is acquired, as shown with box 250. In certain embodiments the second celestial object is different from the first celestial object. In accordance with certain embodiments the first and second celestial objects can be a common celestial object, e.g., the same star, as shown with box 252. Position of the platform is then determined based on the location of the conjunction of the second celestial object in the conjunction image, as shown with box 260. Determining position can include, for example, determining geoposition of the platform relative to an object or location 8 (shown in FIG. 1) on the surface of the earth, velocity of the platform, altitude of the airborne platform, or pointing of the platform by way of non-limiting example.

Position determinations and in-flight calibration updates can be performed while in-flight, while the platform is subject to environmental factors that can influence imaging while in-flight. It is contemplated that the imaging device can be calibrated between conjunction imaging events, as shown by arrow 290. It is also contemplated that the calibration event can be done as a singular event, conjunction imaging and position determinations being thereafter performed, as shown by arrow 280. As will be appreciated by those of skill in the art in view of the present disclosure, one or more in-flight calibration events can remove error in the calibration of pointing of the imaging device that can otherwise accumulate during flight, such as from environmental effects like temperature change, etc., without relying on a model or dedicated sensor arrangement. Once the imaging mission is complete the in-flight calibration of the imaging device is replaced by (or returned to) the ground-based calibration, as shown with box 270, the imaging device thereby being ready for next imaging mission during one or more succeeding imaging missions of the airborne platform, as shown by arrow 292.

It is contemplated that imaging the scene can include using electromagnetic radiation reflected or emitted from an artificial satellite or star, e.g., electromagnetic radiation 11 (shown in FIG. 1), and incident upon the imaging device. The electromagnetic radiation can include illumination from within the visible waveband. The electromagnetic radiation can include illumination from within the infrared waveband. The electromagnetic radiation can be from within one or more of a NIR, SWIR, LWIR, and/or MWIR subdivision of the electromagnetic spectrum. It is contemplated in-flight calibrating the imaging device can done by determining difference between an expected position 32 (shown in FIG. 1) of star 12 and an actual position 34 (shown in FIG. 1) of star 12 in celestial scene 10, and the difference between the expected and actual positions nulled by way of non-limiting example.

Figure 3:
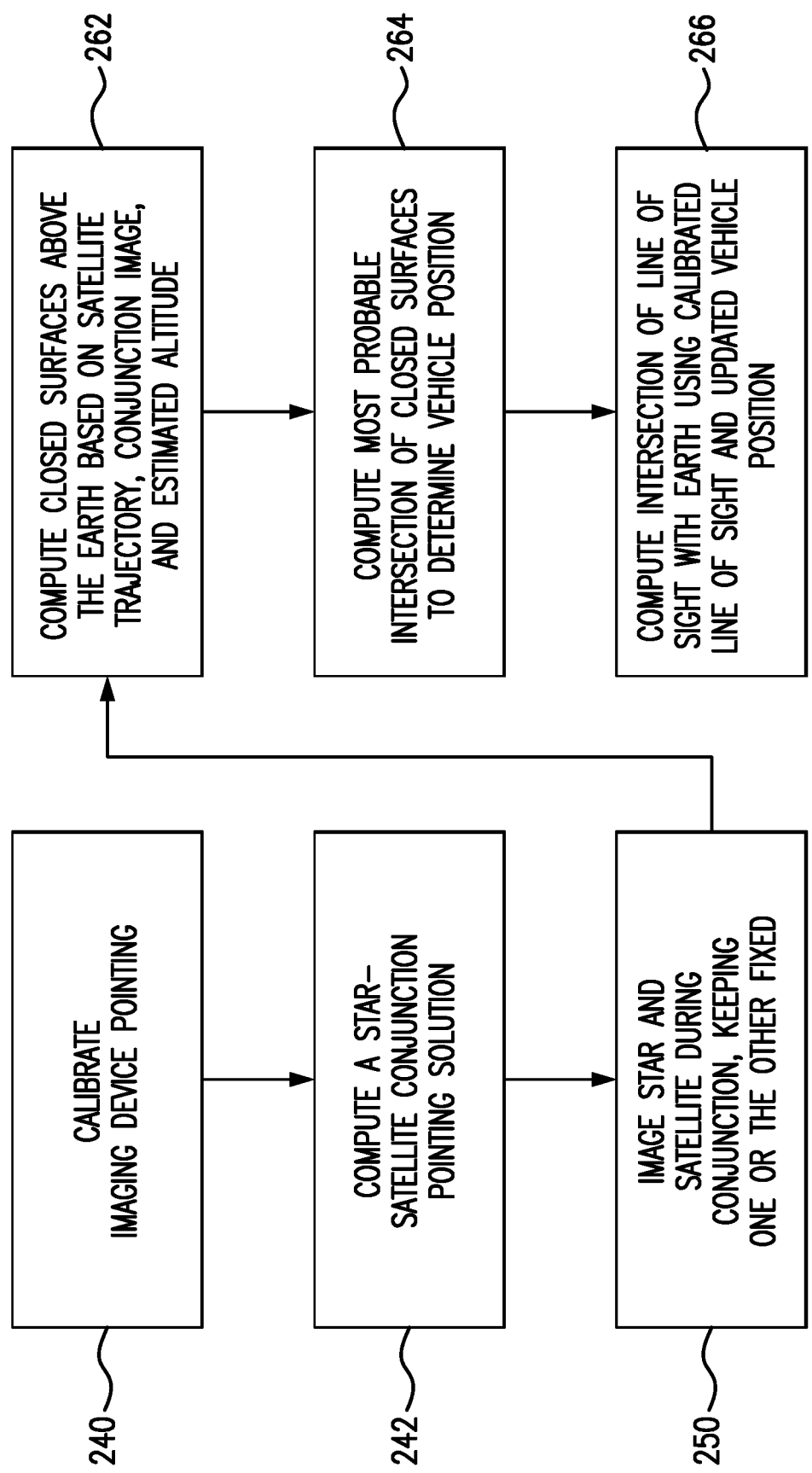
FIG. 3 is a block diagram of steps for calibrating pointing and determining position of an airborne platform using the imaging device illustrated in FIG. 1, showing steps of the method.

With reference to FIG. 3, operations for imaging the conjunction and determining position based on the conjunction as shown according to an exemplary embodiment. As shown with box 240, pointing (i.e., line of sight) of the imaging device is calibrated. This can be done in concert with the navigation system having two or more of position of the airborne platform, access to a star catalog and/or satellite ephemerides. A pointing solution to a conjunction between a satellite and a second celestial object is computed, as shown with box 242. The pointing solution to the conjunction between the satellite and the second celestial object can include multiple calibrations, preferably in multiple directions that are orthogonal to one another.

Once the pointing solution to the conjunction between the satellite and the second celestial object is computed, the imaging device is pointed toward the celestial conjunction scene, as shown in FIG. 1. A succession of images, shown schematically in FIG. 1, including the second celestial object and the artificial satellite are acquired during conjunction of the artificial satellite and the second celestial object 12 as one moves relative to the other, as shown by box 250. Pointing of imaging device during acquisition of the conjunction can be fixed relative to the second celestial object. Pointing of the imaging device during acquisition of the conjunction images can be fixed relative to the artificial satellite. Selection between pointing of the imaging device between the second celestial object and the artificial satellite can be selectable, for example, by the quality of the imaged celestial object. In certain embodiments the selection can be based on a comparison of the signal-to-noise ratios of image portions containing the second celestial object and the artificial satellite in the conjunction images. It is contemplated that pointing to the second celestial object and artificial satellite can be calculated simultaneously during conjunction of the satellite and the second celestial object.

Once conjunction of the satellite and the star is imaged, closed surfaces above the earth based on satellite trajectory, the conjunction image, and estimated altitude of the airborne platform are computed, as shown with box 262. In certain embodiments the closed surfaces can each three-dimensional ellipsoids, and base the on the three-dimensional ellipsoids, the most probable intersection of closed surfaces are computed to determine position of the airborne platform, as shown with box 264. Intersection of the pointing of the imaging device is thereafter computed using the calibrated pointing of the imaging device and the updated position of the airborne platform, as shown with box 266. As will be appreciated by those of skill in the art in view of the present disclosure, use of a recently updated (i.e. while in-flight and/or immediately prior to imaging the conjunction of the satellite and star) calibration pointed of the imaging device and updated position of the airborne platform provides a more accurate determination of objects and ground locations of objects, e.g., object 8 (shown in FIG. 1), imaged by the airborne platform.

The methods and systems of the present disclosure, as described above and shown in the drawings, provide for navigation systems and methods with superior properties including improved navigation systems and methods of determining position of airborne platforms without reliance on GPS. In certain embodiments navigation can be performed by the imaging system itself, eliminating the need for the platform to include a navigation system. While the apparatus and methods of the subject disclosure have been shown and described with reference to preferred embodiments, those skilled in the art will readily appreciate that change and/or modifications may be made thereto without departing from the scope of the subject disclosure.

What is claimed is:
1. A navigation method, comprising:
calibrating, by a ground calibration, pointing of an imaging device while the imaging device is positioned on the ground;

imaging for capturing a first image of scene of a first celestial object with the imaging device while the imaging device is positioned on an airborne platform;

calibrating, by a inflight calibration, pointing of the imaging device while positioned on the airborne platform to a position of the first celestial object in the image;

replacing the ground calibration with the inflight calibration;

pointing the imaging device using the inflight calibration to image a celestial scene of a conjunction of a second celestial object and an artificial satellite;

imaging for capturing a second image with the imaging device, the second image having the conjunction of the second celestial object and the artificial satellite; and determining a position of the airborne platform using a position of the conjunction of the second celestial object and the artificial satellite in the second image.

2. The navigation method as recited in claim 1, wherein imaging for capturing the first and second images includes imaging the celestial scene by sensing electromagnetic radiation in the infrared spectrum emitted or reflected from the first and second celestial objects and the artificial satellite, wherein the first and second celestial objects are each one of a star and an artificial satellite.

3. The navigation method as recited in claim 1, wherein imaging for capturing the first and second images includes imaging the celestial scene by sensing visible illumination incident upon the imaging device and/or nonvisible electromagnetic radiation emitted or reflected from the first and second celestial objects and the artificial satellite, wherein the first and second celestial objects are each one of a star and an artificial satellite.

4. The navigation method as recited in claim 1, wherein calibrating by the inflight calibration includes determining a difference between an expected position of the first celestial object and an actual position of the first celestial object in the first image.

5. The navigation method as recited in claim 4, wherein calibrating by the inflight calibration further includes nulling a difference between the expected position of the first celestial object in the first image and the actual position of the first celestial object in the first image.

6. The navigation method as recited in claim 1, further comprising computing a second celestial object-star pointing solution using the second image.

7. The navigation method as recited in claim 6, wherein computing the second celestial object-star pointing solution includes determining the pointing for pointing to the second celestial object and the artificial satellite simultaneously.

8. The navigation method as recited in claim 6, wherein imaging for capturing the second image includes keeping one of the second celestial object and the artificial satellite fixed while acquiring a plurality of images during pointing using the second celestial object-star pointing solution.

9. The navigation method as recited in claim 1, wherein determining the position of the airborne platform includes computing closed surfaces above the earth base on trajectory of the artificial satellite, the position of the conjunction of the second celestial object and the artificial satellite in the second image, and estimated altitude of the airborne platform.

10. The navigation method as recited in claim 1, wherein determining the position of the airborne platform includes computing an intersection of a line of sight from the airborne platform to the earth using calibrated line of sight and updated vehicle position.

11. The navigation method as recited in claim 1, further comprising receiving at least two of a position of the airborne platform, a star catalog, and a satellite ephemeride.

12. The navigation method as recited in claim 1, wherein the first celestial object and the second celestial objects are a common celestial object.

13. A navigation system, comprising:

an imaging device;

a controller operably connected to the imaging device and responsive to instructions recorded on a non-transitory machine-readable memory to:

calibrate, by a ground calibration, pointing of an imaging device while the imaging device is positioned on the ground;

image for capturing a first image of scene of a first celestial object with the imaging device while the imaging device is positioned on an airborne platform;

calibrate, by a inflight calibration, pointing of the imaging device while positioned on the airborne platform to a position of the first celestial object in the image;

replace the ground calibration with the inflight calibration;

point the imaging device using the inflight calibration to image a celestial scene of a conjunction of a second celestial object and an artificial satellite;

image for capturing a second image with the imaging device, the second image having the conjunction of the second celestial object and the artificial satellite; and determine a position of the airborne platform using a position of the conjunction of the second celestial object and the artificial satellite in the second image.

14. The navigation system as recited in claim 13, wherein the imaging device includes a focal plane detector responsive to visible or infrared illumination to image a scene.

15. The navigation system as recited in claim 13, wherein calibrating by the inflight calibration includes determining a difference between an expected position of the first celestial object and an actual position of the first celestial object in the first image, and nulling a difference between the expected position of the first celestial object in the first image and the actual position of the first celestial object in the first image.

16. The navigation system as recited in claim 13, wherein the instructions further cause the controller to compute a second celestial object-star pointing solution using the second image, and compute the second celestial object-star pointing solution by determining the pointing for pointing to the second celestial object and the artificial satellite simultaneously.

17. The navigation system as recited in claim 13, wherein imaging for capturing the second image includes keeping one of the second celestial object and the artificial satellite fixed while acquiring a plurality of images during pointing using the second celestial object-star pointing solution.

18. The navigation system as recited in claim 13, wherein the imaging device is incorporated in an intelligence, surveillance and reconnaissance device.

19. The navigation system as recited in claim 13, wherein the controller further comprises a navigation module disposed in communication with the imaging device and arranged to determine position based on imagery acquired by the imaging device.

* * * * *